United States Patent
Young et al.

[11] Patent Number: 6,120,936
[45] Date of Patent: Sep. 19, 2000

[54] METHOD FOR POWDER FORMATION OF A HYDROGEN STORAGE ALLOY

[75] Inventors: Kwo Young, Troy; Michael A. Fetcenko, Rochester Hills, both of Mich.

[73] Assignee: Ovonic Battery Company, Inc., Troy, Mich.

[21] Appl. No.: 09/141,668

[22] Filed: Aug. 27, 1998

[51] Int. Cl.[7] .............................. H01M 4/52; H01M 4/58
[52] U.S. Cl. .................................. 429/218.2; 429/231.5; 429/224; 419/3
[58] Field of Search ................. 429/218.2, 59; 419/3

[56] References Cited

U.S. PATENT DOCUMENTS

| | | | |
|---|---|---|---|
| 4,370,163 | 1/1983 | Moriwaki | 420/582 |
| 4,551,400 | 11/1985 | Sapru | 429/94 |
| 4,820,481 | 4/1989 | Wolff | 419/3 |
| 4,893,756 | 1/1990 | Fetcenko | 241/33 |
| 4,915,898 | 4/1990 | Wolff | 419/3 |
| 4,948,423 | 8/1990 | Fetcenko | 75/10.14 |
| 5,223,054 | 6/1993 | Yoshimoto | 148/669 |
| 5,281,390 | 1/1994 | Gamo | 420/422 |
| 5,354,040 | 10/1994 | Nakayama | 266/252 |
| 5,505,794 | 4/1996 | Nakayama | 148/508 |
| 5,554,456 | 9/1996 | Ovshinsky | 429/59 |
| 5,626,988 | 5/1997 | Daniel-Ivad | 429/229 |
| 5,864,072 | 1/1999 | Kobayashi | 75/246 |
| 5,900,334 | 5/1999 | Wada | 429/218.2 |

*Primary Examiner*—Maria Nuzzolillo
*Assistant Examiner*—Mark Ruthkosky
*Attorney, Agent, or Firm*—Dean B. Watson; Marvin S. Siskind; David W. Schumaker

[57] ABSTRACT

A novel method for forming powder of a hydrogen storage alloy without the need for further mechanical processing. The alloy powder may be adapted for use as the negative electrode material of rechargeable electrochemical, hydrogen storage cells. The method includes the step of controlling the hydrogen concentration within the hydrogen storage alloy to form powder where 90% of the particles are less than 250 microns in average dimension.

48 Claims, 6 Drawing Sheets

METHOD FOR POWDER FORMATION OF A HYDROGEN STORAGE ALLOY

FIELD OF THE INVENTION

The present invention relates to the manufacture of electrochemical hydrogen storage material. More particularly, the present invention relates to an improved method for forming powder of hydrogen storage alloy materials which may be adapted for use, by way of example and not limitation, as the negative electrode material for rechargeable electrochemical cells.

BACKGROUND OF THE INVENTION

Electrochemical cells which utilize a negative electrode that is capable of reversibly, electrochemically storing hydrogen are known in the art. Such rechargeable electrochemical cells utilize a negative electrode which is formed of a hydrogen storage alloy, one example of such a negative electrode hydrogen storage alloy being a transition metal based alloy. The electrochemical cell also employs a positive electrode typically formed of nickel hydroxide material. Rechargeable electrochemical cells of this nature are commonly referred to as "nickel metal hydride cells" (NiMH) due to the nickel hydroxide positive electrode and the hydride nature of the metal used in the negative electrode.

When an electrical potential is applied between the electrolyte and the metal hydride negative electrode of a NiMH cell, the negative electrode (M) is charged by the electrochemical absorption of hydrogen and the electrochemical evolution of a hydroxyl ion:

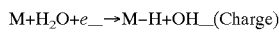
M+H$_2$O+e$_-$ →M-H+OH$_-$ (Charge)

Upon discharge, the negative electrode material releases the stored hydrogen to form a water molecule and consumes an hydroxyl ion:

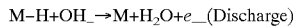
M-H+OH$_-$ →M+H$_2$O+e$_-$ (Discharge)

The reactions are reversible.

When an electrical potential is applied between the electrolyte and the nickel hydroxide positive electrode, the electrode releases hydrogen to form a water molecule and consumes one hydroxyl ion:

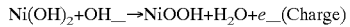
Ni(OH)$_2$+OH$_-$ →NiOOH+H$_2$O+e$_-$ (Charge)

Discharge of the positive electrode is characterized by the electrochemical evolution of a hydroxyl ion:

NiOOH+H$_2$O+e$_-$ →Ni(OH)$_2$+OH$_-$ (Discharge)

These reactions are also reversible.

A cell utilizing an electrochemically rechargeable hydrogen storage negative electrode offers important advantages over conventional secondary batteries. Rechargeable hydrogen storage negative electrodes offer significantly higher specific charge capacities (ampere hours per unit mass and ampere hours per unit volume) than do either lead negative electrodes of lead acid batteries or cadmium negative electrodes of NiCd batteries. As a result of the higher specific charge capacities, a higher density (in watt hours per unit mass or watt hours per unit volume) is possible with NiMH storage batteries than with the prior art systems, making NiMH storage cells particularly suitable for many commercial applications.

High density energy storage is achieved by providing disordered materials which can be tailor-made to greatly increase the reversible hydrogen storage characteristics required for efficient and economical battery applications. A battery which uses disordered materials as a hydrogen storage negative electrode is disclosed in commonly assigned U.S. Pat. No. 4,623,597 to Sapru, et al for RECHARGEABLE BATTERY AND ELECTRODE USED THEREIN, incorporated herein by reference. Disordered materials are designed to have a substantially increased density of storage and catalytically active sites which provide a significant improvement of hydrogen adsorption and desorption. Disordered materials are designed to have unusual electronic configurations, which result from varying three-dimensional interactions of constituent atoms and their various orbitals. The disorder comes from compositional and translational relationships of atoms that are not limited by crystalline symmetry in their freedom to interact.

In commonly assigned U.S. Pat. No. 4,551,400 to Sapru, Hong, Fetcenko and Venkatesan for HYDROGEN STORAGE MATERIALS AND METHODS OF SIZING AND PREPARING THE SAME FOR ELECTROCHEMICAL APPLICATION, incorporated herein by reference, a hydriding-dehydriding comminution process was first disclosed for initial size reduction of bulk ingots of hydrogen storage alloy material. The '400 patent teaches a comminution process where hydrogenation is conducted at a hydrogen gas pressure between about 100 and 2000 psi. A hydrogen gas pressure above about 200 psi. was necessary to form a hydride at room temperature in Sapru, et al. These conditions depend on the composition of the material and its geometry.

Suitable active materials for the negative electrode are also disclosed in the '400 patent. The materials described therein store hydrogen by reversibly forming hydrides. The materials of Sapru, et al have compositions of:

(TiV$_{2-x}$Ni$_x$)$_{1-y}$M$_y$ where 0.2≦x≦1.0, 0≦y≦0.2 and M=Al or Zr;

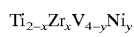
Ti$_{2-x}$Zr$_x$V$_{4-y}$Ni$_y$ where 0.2≦x≦1.5, 0.6≦y≦3.5; and

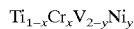
Ti$_{1-x}$Cr$_x$V$_{2-y}$Ni$_y$ where 0≦x≦0.75, 0.2≦y≦1.0.

Reference may be made to U.S. Pat. No. 4,551,400 for further descriptions of these materials and for methods of making them.

Selected elements can be utilized to further modify the disorder by their interaction with these orbitals so as to create the desired local chemical environments.

Other suitable materials for the negative electrode are disclosed in commonly assigned U.S. Pat. No. 4,728,586, incorporated herein by reference, to Venkatesan, Reichman and Fetcenko for ENHANCED CHARGE RETENTION ELECTROCHEMICAL HYDROGEN STORAGE ALLOYS AND AN ENHANCED CHARGE RETENTION ELECTROCHEMICAL CELL. As described in the above referenced '586 patent of Venkatesan, et al, one class of particularly desirable hydrogen storage alloys comprises titanium, vanadium, zirconium, and nickel, and at least one modifier element selected from the group consisting of copper, iron manganese, cobalt, and chromium. The preferred alloys described in Venkatesan, et al are alloys of titanium, vanadium, zirconium, nickel, and chromium, especially alloys having a composition represented by the formula:

$$(Ti_{2-x}Zr_xV_{4-y}Ni_y)Cr_z$$

where x is between 0.0 and 1.5, y is between 0.6 and 3.5, and z is an effective amount less than 0.20.

Commonly assigned U.S. Pat. No. 5,536,591 to Fetcenko, et al for ELECTROCHEMICAL HYDROGEN STORAGE ALLOYS FOR NICKEL METAL HYDRIDE BATTERIES, incorporated herein by reference, discloses an improved hydrogen storage alloy having a significant increase in the frequency of occurrence of nickel regions resulting in significantly increased catalysis and conductivity. The '591 patent discloses two methods of increasing the frequency of occurrence of enriched nickel regions. One method specifically formulates an alloy having a surface region that is etched to remove oxides leaving the enriched nickel regions. The second method includes formulating a first electrochemical hydrogen storage alloy and alloying a secondary alloy formulated to contain components that are corroded during etching to leave enriched nickel regions. The preferred alloy disclosed in the '591 patent is (Base alloy) $_aCo_bMn_cFe_dSn_e$, where base alloy comprises 0.1 to 60 atomic percent V, 0.1 to 57 atomic percent Ni, and 0 to 56 atomic percent Cr; b is 0 to 7.5 atomic percent; c is 13 to 17 atomic percent; d is 0 to 3.5 atomic percent, e is 0 to 1.5 atomic percent; and a+b+c+d+e=100 atomic percent.

Subtle changes in the local chemical and structural order for the addition of modifiers have significant effects on the electrochemical properties of negative electrodes incorporating hydrogen storage alloys. A modified, multicomponent, multiphase, reversible electrochemical hydrogen storage alloy is disclosed in commonly assigned U.S. Pat. No. 5,096,667 to Fetcenko for CATALYTIC HYDROGEN STORAGE ELECTRODE MATERIALS FOR USE IN ELECTROCHEMICAL CELLS AND ELECTROCHEMICAL CELLS INCORPORATING THE MATERIALS, incorporated herein by reference. The invention disclosed in the '667 patent teaches the subtle changes in stoichiometry, by the addition of individual metallic substitutes in the Ti—V—Zr—Ni type structure, provides enhanced properties. According to the invention, it is possible to do one or more of the following: increase cycle life; increase the specific capacity; increase the mid-point voltage at various discharge rates; decrease the polarization at various discharge rates; increase the low temperature specific capacity; increase the low temperature mid-point voltage; decrease the low temperature polarization; or decrease the self-discharge rate.

The hydrogen storage alloy is initially formed as a bulk ingot from a melt. A method of producing a hydrogen storage alloy is disclosed in commonly assigned U.S. Pat. No. 4,948,423 to Fetcenko, Sumner, and LaRocca for ALLOY PREPARATION OF HYDROGEN STORAGE MATERIALS, incorporated herein by reference. The hydrogen storage negative electrodes utilizing the aforementioned alloys are of relatively high hardness. Indeed, these alloys can typically exhibit Rockwell "C" ("Rc") hardness of 45 to 60 or more. Moreover, in order to attain the high surface areas per unit volume and per unit mass necessary for high capacity electrochemical performance, the alloy must be in the form of fine particles. In a preferred exemplification, the hydrogen storage alloy powder must pass through a 200 U.S. mesh screen, thus being smaller than 75 microns in size (200 U.S. mesh screen has interstices of about 75 microns). Therefore, the resulting hydrogen storage alloy material is comminuted, e.g., crushed, ground, milled or the like, before the hydrogen storage material is fabricated into electrode form.

Comminution of bulk ingots of hydrogen storage alloy material is made more difficult because the materials described hereinabove are quite hard, and therefore do not easily fracture into particles of uniform size and shape. In commonly assigned U.S. Pat. No. 4,893,756 to Fetcenko, Kaatz, Sumner, and LaRocca for HYDRIDE REACTOR APPARATUS FOR HYDROGEN COMMINUTION OF METAL HYDRIDE HYDROGEN STORAGE MATERIAL, the disclosure of which is incorporated herein by reference, a hydride-dehydride cycle comminution process was disclosed for initial size reduction of bulk ingots of hydrogen storage alloy material to flakes of about 80–100 mesh size. While this process is effective for the initial size reduction of hydrogen storage alloy, it is inadequate for the task of further comminuting particulate hydrogen storage alloy powder to the required particle size of 75 microns or less (i.e. 200 mesh or less). The approximately 200–400 mesh size distribution has been experimentally determined to provide performance superior to other sizes of material in the negative electrode of metal hydride, hydrogen storage electrochemical cells.

Any method which can accomplish the objective of providing economical size reduction of the metal hydride material is a potential candidate for commercial processing. However, there are numerous characteristics of the material which require special handling, instrumentation and other precautions. These characteristics include: (1) inherent alloy powder hardness, i.e., approximately Rockwell "C" ("Rc") 60 hardness. This means that conventional size reduction processes of shear, abrasion and some types of impact mechanisms as ball mills, hammer mills, shredders, fluid energy, and disk attrition, are not very effective; (2) sensitivity to oxidation, such that comminution must be done under an inert environment to provide a safe environment and maintain acceptable electrochemical performance; (3) requirement of a specific crystalline structure necessary for electrochemical activity; i.e., the microstructure of the material cannot be adversely altered during grinding or atomization to produce powders directly from a melt; and (4) requirement of a broad particle size distribution with a maximum size of 75 microns (200 mesh) which provides optimum packing density and electrochemical accessibility.

Early attempts to provide a method for size reduction of hydrogen storage alloy materials proved inadequate due to the extreme hardness of the hydrogen storage alloy materials. Conventional size reduction techniques employing devices such as jaw crushers, mechanical attritors, ball mills, and fluid energy mills consistently fail to economically reduce the size of such hydrogen storage materials. Grinding and crushing techniques have also proven inadequate for initial reduction of ingots of hydrogen storage alloy material to intermediate sized (i.e. 10–100 mesh) particulate There are numerous methods for preparing metal powders. Since the alloys under consideration are at one stage molten, one might consider ultrasonic agitation or centrifugal atomization of the liquid stream to prepare powders directly. The cost and the product yield are the two main concerns with using this approach. The particle shape is also not optimal. Finally, because it is difficult to provide a completely inert atmosphere; surface layers, which are undesirable from an electrochemical perspective, may be formed on the particulate.

Attempts to embrittle the hydrogen storage alloy material by methods such as immersion in liquid nitrogen, so as to facilitate size reduction are inadequate because: (1) the materials are not sufficiently embrittled; (2) the methods typically introduce embrittlement agents in the alloys which have an undesirable effect upon the electrochemical properties of the hydrogen storage alloy material; and (3) as the materials become more brittle, it becomes increasingly difficult to obtain uniform particle size distribution. Other methods for embrittling metals are disclosed, for example, in Canadian patent No. 533,208 to Brown. However, Brown identifies many disadvantages of treating vanadium metal (a component of the metal hydride storage material) with hydrogen gas. Brown employs cathodic charging as a size reduction technique.

Hydrogen storage materials are not amenable to mechanical size reduction techniques due to their inherent high material hardness. Frequently, significant wear of the grinding medium is observed. Even if one decides to use such mechanical techniques, it is difficult to attain the desired range of particle size since the materials are difficult to grind. A high fraction of powder just under the specified maximum value is frequently observed. Also, grinding processes invariably have low yield factors, that is, an unacceptably high fraction of the feed stock of particulate hydrogen storage alloy is oversized. In commonly assigned U.S. Pat. No. 4,915,898 to Wolff, Nuss, Fetcenko, Lijoi, Sumner, LaRocca, and Kaatz for METHOD FOR THE CONTINUOUS FABRICATION OF COMMINUTED HYDROGEN STORAGE ALLOY MATERIAL NEGATIVE ELECTRODES, MATERIAL an improved comminution process for metal hydride particulate production was achieved by a hydride-dehydride cycle followed by an impact cycle. While this process is an excellent particle size reduction process, the process remains partially mechanical in nature in that final particle size reduction is achieved by propelling the particulate material against an impact block, therefore requiring the rotor chamber to be cleaned between batches. Furthermore, component part life is short because of the hardness of the hydrogen storage material. Obviously, any processing for size reduction after hydriding adds additional complexity and cost, as a result of additional handling, material transfer, capital equipment, process energy and gasses.

Accordingly, there exists a need in the art for an improved method of forming a powder of a hydrogen storage alloy without the need for mechanical processing following the hydriding/dehydriding step.

SUMMARY OF THE INVENTION

The present invention provides a novel method for forming powder of a hydrogen storage alloy without need for further mechanical processing. The alloy powder may be adapted for use as the negative electrode material of rechargeable electrochemical, hydrogen storage cells. It may also be used for thermal hydrogen storage applications.

Test results show that powder yield of a hydrogen storage alloy formed by a hydride process is a result of three principle factors: (1) hydrogenation temperature; (2) hydrogen pressure; and (3) the amount of alloy to be hydrided compared to the available volume (packing factor). From a pressure-concentration isotherm (PCT) study, the hydrogen concentration within a hydrogen storage alloy is a known, precise function of both the equilibrium pressure of hydrogen and alloy temperature. By associating the three factors with the PCT information, one determines that particle size distribution is actually a function of the amount of hydrogen absorbed.

By carefully selecting the hydrogen pressure and alloy temperature, powder yield may be controlled as a function of the hydrogen absorbed within the alloy. For a given hydrogen pressure, an alloy temperature, hereinafter referred to as the "hydrogenation temperature," may be determined at which the hydrogenation process provides a predicted powder yield.

The method comprises the steps of providing hydrogen storage alloy in a reaction vessel. Residual air is then removed from the reaction vessel and hydrogen gas is introduced into the reaction vessel. Heat generated during the hydrogenation process is removed and the hydrogen storage alloy is cooled to a hydrogenation temperature.

The hydrogen storage alloy is hydrogenated at the hydrogenation temperature whereby hydrogen concentration within the hydrogen storage is controlled to provide a powder yield having a particle size range where 90% of the particles have a particle size below 250 microns.

These and other objects and advantages of the present invention will become apparent from the Detailed Description, Drawings, and Claims recited herein.

DETAILED DESCRIPTION OF THE INVENTION

Figure 1:
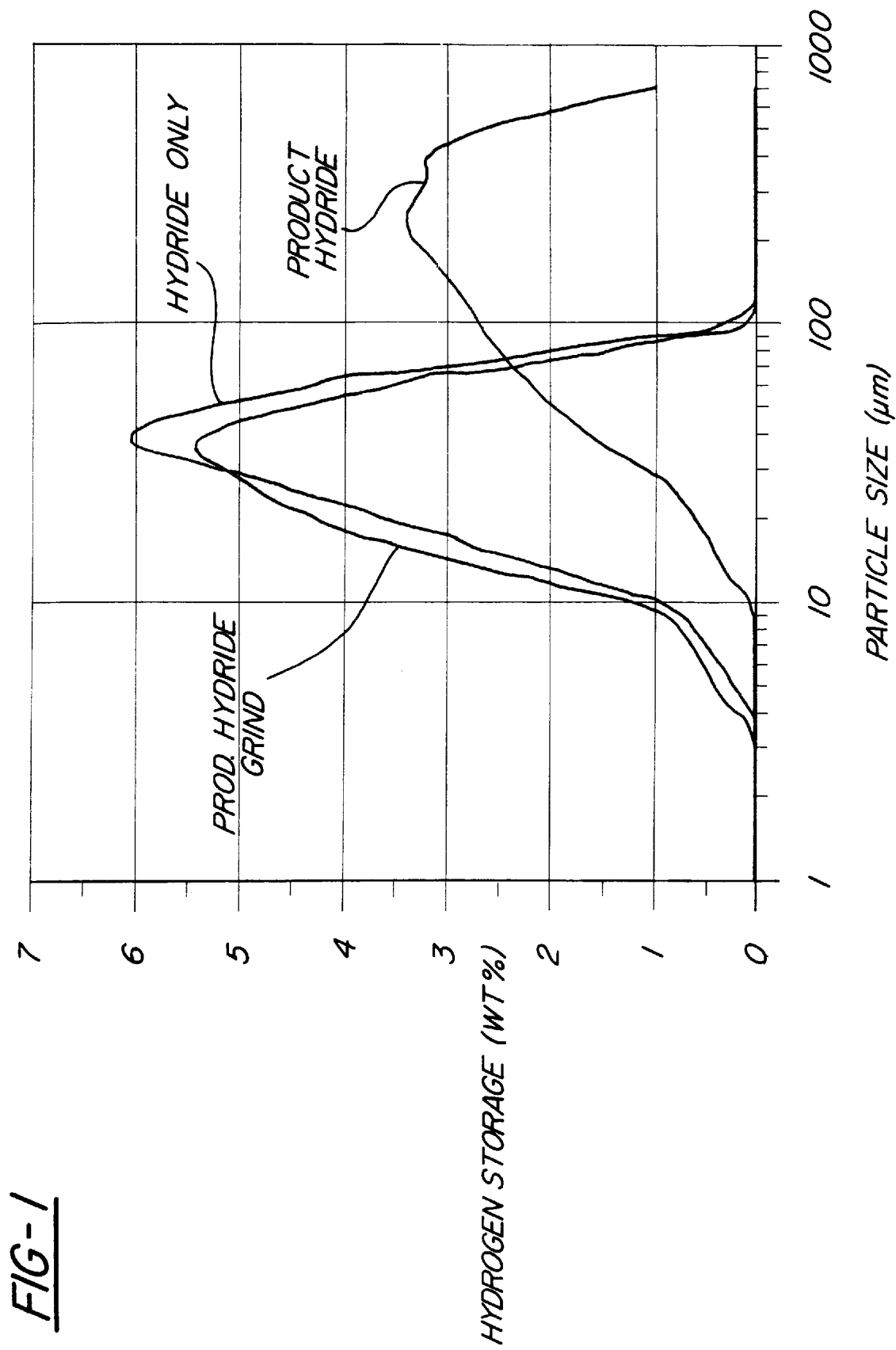
FIG. 1 depicts a series of graphs showing the particle size distribution of the present invention (plot (c)) compared to particle size distributions (i) obtained from a current hydride process (plot (a)) and (ii) a hydride and grinding process used in the production of hydrogen storage material (plot (b))

The present invention provides a novel method for forming powder of a hydrogen storage alloy without the need for subsequent mechanical size reduction processing. The current process for producing hydrogen storage alloy material includes melting precursor raw materials to form an ingot of a desired composition followed by a hydride process, a dehydride process, and then a mechanical grinding operation to generate powder of a suitable size to be adapted for either thermal or electrochemical applications.

Synthesis of the alloy is the first process in the production of a hydrogen storage alloy. The synthesis of the alloy begins with selection of precursor materials. Materials commonly employed in the synthesis of hydrogen storage materials are disclosed in the aforementioned '586 patent and include, but are not limited to, titanium, zirconium, vanadium, nickel and chromium and thermally decomposable compounds thereof. Although other suitable methods for forming a bulk hydrogen storage alloy exist, U.S. Pat. No. 4,948,423, previously incorporated by reference, discloses a method for preparation of such an alloy. After preparing the bulk hydrogen storage alloy, commonly referred to as an ingot, the alloy must be processed further.

In order for the hydrogen storage alloy to be adapted for use, such as the negative electrode material of a rechargeable electrochemical cell, the ingot must be reduced in size to fine particles, less than about 75 µm in size, referred to herein as powder. Powder yield is the percentage of particles formed that are within a particular size range per unit volume. For purposes of the instant invention, it is required that a particle pass through a 200 U.S. mesh (about 75 µm) screen in order to be appropriately sized for electrochemical use. The percentage of particles that pass through the 200 mesh screen represent the powder yield. The process of reducing the ingot to a powder is commonly referred to as "comminution." A superior method for comminution of hydrogen storage material is hydrogenation (also synonymously referred to as "hydriding").

The hydrogenation process was developed at Ovonic Battery Company and is currently the first step of particle size reduction. After hydrogenation, a dehydrogenation (also synonymously referred to as "dehydriding") process is completed to remove hydrogen from the hydrogen storage alloy. However, the particle size distribution after completion of the hydrogenation/dehydrogenation process is not optimum and further processing is required. Due to the hardness of the ingot, Rc 40 to 65, or greater, conventional grinding or crushing is difficult.

The hydrogen storage alloy is processed further by a grind and sieve operation. The pyrophoric nature of the fine particulate of the alloy requires precautions when the grinding operation is performed. Also, the grinding device must be cleaned between batches to remove powder residing in the grinding device. Furthermore, parts within the grinding device must be replaced frequently because of wear caused by the hardness of the alloy. Therefore, these additional process steps generate significant safety and cost issues.

The present invention is a method for forming a powder by an improved hydrogenation process, eliminating the need for subsequent mechanical processing of the particulate material. "Mechanical process", for purposes of the present invention, refers to any process for grinding, crushing, impacting, or the like, including processes employing devices such as: jaw crushers, mechanical attritors, ball mills, fluid energy mills, and impact mills. Although an internal stress fracture of a material is sometimes referred to as a "mechanical fracture", the phrase "mechanical process" is intended to refer to the external process acting upon the alloy, and not the result of a process, such as an internal stress fracture.

The hydrogenation process begins with placing an ingot of hydrogen storage alloy into a reaction vessel. The reaction vessel is sealed and residual air is removed to prevent the air from reacting with the hydrogen storage alloy. One method of removing air from the reaction vessel is to pump down the pressure within the reaction vessel, which may take 3 hours or longer. Another method for removing air is to "flush" the air from the reaction vessel and hydrogen storage alloy by introducing an inert gas into the reaction vessel. The aforementioned methods of removing residual air from the contents of the reaction vessel are examples for purpose of illustration and not of limitation and it should be noted that any method may be employed to remove residual air from the reaction vessel. After the residual air is removed from the reaction vessel, the hydrogenation process may begin.

A hydrogenation process introduces hydrogen gas under appropriate temperature, pressure, and time conditions into the reaction chamber with the ingot. The principle of hydrogenation is to use the high hydrogen storage capability of the hydrogen storage alloy to cause the alloy to fracture. As the ingot absorbs hydrogen, the host lattice structure within the alloy expands to accommodate the hydrogen. As the lattice structure expands, internal stresses within the alloy are created and the ingot fractures into very small particulate to reduce the stress created by adsorption. When the hydrogenation process is completed, very small particles are formed.

The hydrogenation process commences immediately upon hydrogen gas adsorption by the ingot. One method of evaluating the degree of hydriding is to monitor the amount of hydrogen which has been used. The amount of hydrogen used is the difference between the known quantity of hydrogen introduced into the vessel and the measured quantity removed upon evacuation. As hydrogen is introduced into the reaction vessel, the temperature within the vessel rises due to the exothermic nature of the hydride formation reaction (approximately 10 Kcal/mol of $H_2$ gas). The reaction vessel may be cooled to control the temperature increase. A hydriding reaction conducted without the benefit of cooling yields powder temperatures in excess of 150° C.

The novel process of the present invention may be employed with a number of suitable active materials. An example of such active materials is disclosed in commonly assigned U.S. Pat. No. 5,407,761 to Ovshinsky, et al for ELECTROCHEMICAL HYDROGEN STORAGE ALLOYS AND BATTERIES FABRICATED FROM THESE ALLOYS HAVING SIGNIFICANTLY IMPROVED CAPACITY, incorporated herein by reference. The '761 patent discloses a hydrogen storage alloy having the composition (Base Alloy)$_a$Co$_b$Mn$_c$Fe$_d$Sn$_e$, where the Base Alloy comprises 0.1 to 60 atomic percent Ti, 0.1 to 25 atomic percent Zr, 0.1 to 60 atomic percent V, 0.1 to 57 atomic percent Ni and 0 to 56 atomic percent Cr; b is 0 to 7 atomic percent; c is 13 to 30 atomic percent; d is 0 to 3.5 atomic percent; e is 0 to 1.0 atomic percent; and a+b+c+d+e=100 atomic percent. Another example of such an active material is disclosed in commonly assigned, previously incorporated by reference, U.S. Pat. No. 5,536,591 to Fetcenko, et al for ELECTROCHEMICAL HYDROGEN STORAGE ALLOYS FOR NICKEL METAL HYDRIDE BATTERIES. Still another example of a suitable active material is the hydrogen storage alloy having the composition (Base Alloy)$_a$Co$_b$Mn$_c$Fe$_d$Sn$_e$, where the Base Alloy comprises 0 to 60 atomic percent Ti, 0.1 to 40 atomic percent Zr, 0 to 60 atomic percent V, 0.1 to 57 atomic percent Ni and 0 to 56 atomic percent Cr; b is 0 to 7.5 atomic percent; c is 12 to 30 atomic percent; d is 0 to 3.5 atomic percent; e is 0 to 1.0 atomic percent; and a+b+c+d+e=100 atomic percent. The foregoing are specific examples of hydrogen storage alloys that may be comminuted by the hydrogenation process disclosed herein, however, it should become apparent to one skilled in the art that the hydrogenation process of the present invention is suitable for particle size reduction of a variety of suitable active materials.

Previous work in the art of comminution by hydrogenation suggested a relationship between reduction in the particle size of the hydrogen storage alloy and reaction rate, although the relationship was unquantified. Many factors were speculated to influence the powder yield, such as: the maximum temperature attained during hydriding, pressure ramp up time, hydriding temperature profile, final dehydride pressure, necessity of tumbling the vessel, and the necessity of water cooling. Prior to the instant invention, an experiment was conducted to determine the influence of these factors on powder yield. This experiment provided unexpected results.

The results of the experiment determined that only three factors are relevant to powder yield: (1) hydrogenation temperature; (2) hydrogen pressure; and (3) the amount of alloy to be hydrided in a given volume.

From a pressure-concentration isotherm (PCT) study, the hydrogen concentration within a hydrogen storage alloy is a known, precise function of both the equilibrium pressure of hydrogen and alloy temperature. The results of the PCT study have been reduced to a set of curves that are known in the art as PCT curves. If both the temperature and pressure are known, the amount of stored hydrogen can be obtained from the PCT curves.

The amount of hydrogen stored in the alloy is a distinct event from the hydrogen diffusion rate in that the amount of hydrogen stored in the alloy causes the alloy to fracture, the diffusion rate is the change in concentration with respect to time. The hydrogen diffusion rate, which refers to the mobility of hydrogen through an alloy, is a function of the composition and geometry of the alloy. Although the diffusion rate for a first alloy may be higher than the diffusion rate for a second alloy, the net result is a longer period of time will be required for an equivalent hydrogen concentration in the second alloy. The same hydrogen concentration may be achieved, however the period of time required to achieve the hydrogen concentration must be increased for the second alloy. For example, a Zirconium (Zr) rich alloy, about 25% to 40% Zr, has a propensity to diffusion or absorb hydrogen.

The mechanical properties of an alloy, such as modulus of elasticity, Young's modulus, shear modulus, hardness, ultimate strength, yield strength, toughness, and ductility will affect the results of the hydrogenation process. An alloy subject to a hydrogenation process that is more resistant to fracture will not have the same powder yield than an alloy that is less resistant to fracture would with all other relevant factors being equal.

It is known that the volume expansion of a fully hydrided alloy can be as large as 20–23%. As disclosed above, lattice expansion causes large internal stresses and the ingot fractures into smaller particles to reduce that internal stress. The results of the experiment show that particle size distribution of a hydrogen storage alloy formed by a hydrogenation process is determined by the aforementioned three factors. However, by extracting the hydrogen concentration information from the PCT curves, the particle size distribution is actually a function of the amount of hydrogen adsorbed, taking into account the mechanical properties of the material being hydrided. Therefore, powder yield (for example <75 $\mu$m), may be controlled by controlling the amount of hydrogen adsorbed by the alloy. By controlling the temperature of the powder and hydrogen gas pressure within the reaction vessel, the PCT curves provide the hydrogen concentration within the hydrogen storage alloy. By appropriately selecting the hydrogen pressure and alloy temperature, powder yield may be controlled as a result of the hydrogen adsorbed within the alloy. For a given hydrogen pressure, an alloy temperature, hereinafter referred to as hydrogenation temperature, may be determined at which the hydrogenation process forms a predicted powder yield.

Referring now to FIG. 1, a graphical representation of the particle size distribution formed by the method of the present invention, indicated by plot "c", is compared to a production hydride and grind process, indicated by plot "b", and a current production hydride process without mechanical processing, indicated by plot "a". The volume ratio in arbitrary units for each process, plotted along the Y-axis, is plotted against particle size in microns, represented on a logarithmic X-axis.

The advantages of the present invention are readily apparent to one skilled in the art. Since most of the particles formed by the current production hydride process without mechanical processing, indicated by plot "a", are above 100 $\mu$m in size, further processing is required. For example, in order for the powder formed by the current production hydride process to be adapted for use in the production of a negative electrode of an electrochemical cell where the maximum allowable particle size is 75 $\mu$m, further mechanical processing is required. Comparing plots "c" and "b" in FIG. 1, the present invention provides a particle size distribution similar to the hydride and grind process with only a hydride step.

Figure 2:
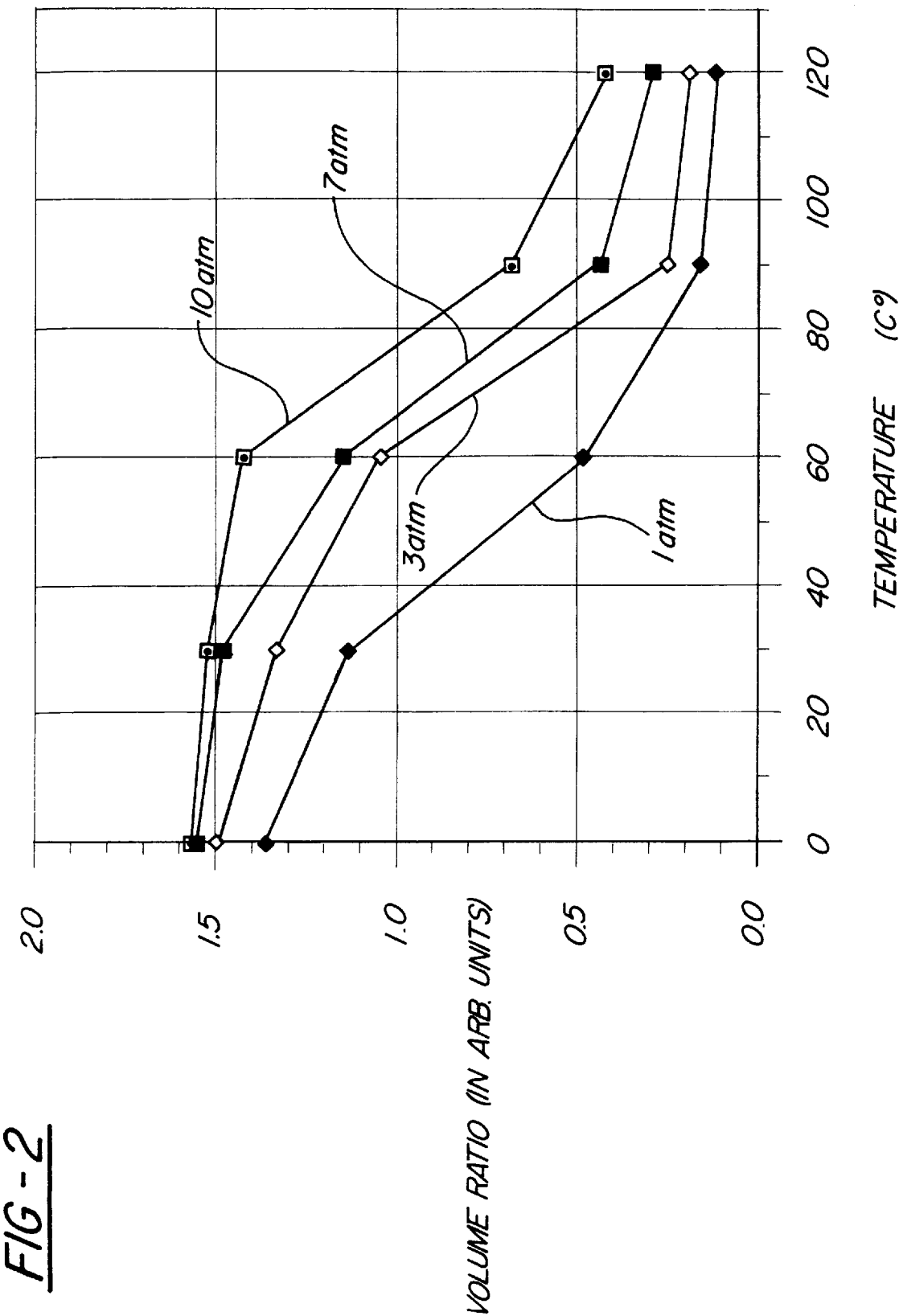
FIG. 2 depicts a series of graphs of the hydrogen storage capacity vs. temperature of a hydrogen storage alloy plotted as a function of hydrogen storage material and pressure.

FIG. 2 demonstrates the hydrogen storage capacity of a given hydrogen storage alloy, plotted along the Y-axis, versus the hydrogenation temperature, plotted along the X-axis, as a function of various constant hydrogen gas pressures. By controlling the hydrogen stored in the hydrogen storage alloy, an improved process for approximately sized powder particles of the alloy is achieved. The information displayed in FIG. 2 may be used to select the hydrogenation temperature and pressure conditions to generate a desired powder yield and engineer the particle size distribution to whatever range is desired. Additionally, the amount of alloy to be hydrided in a given volume may also be selected to engineer the powder yield.

A study was conducted to evaluate the thermal conductivity of the powder. Three particle size ranges of a hydrogen storage alloy powder were evaluated. The first size range consisted of powder screened by passing the powder through a sieve having a 200 mesh screen. The second size range consisted of powder larger than 200 mesh. The third size range was not passed through a sieve. A thermally insulated PVC pipe was loaded with alloy powder for each of the three size ranges. The PVC pipe has a first end disposed in an isothermal bath at elevated temperature. Temperature data was recorded at a second end of the PVC pipe to evaluate the thermal conductivity for each size range and packing density. The measured thermal conductivities of the hydrogen storage alloy as a function of packing density and powder size are listed in table I below:

TABLE I

Measured Thermal Conductivities of Alloy Powder

| Powder Size | Packing Density | Thermal Conductivity |
| --- | --- | --- |
| −200 mesh (<75 $\mu$m) | 2.95 g/cm$^3$ | 0.046 W/cmK |
| +200 mesh (>75 $\mu$m) | 3.05 g/cm$^3$ | 0.014 W/cmK |
| no sieve | 3.10 g/cm$^3$ | 0.019 W/cmK |

The amount of hydrogen storage alloy provided in a reaction vessel is also known as loading. The alloy in powder form has a lower thermal conductivity than the ingot due to limited contact between alloy particles in powder form. Accordingly, the powder acts as a thermal insulator and heat transfer within the reaction vessel is impaired. A result of the low thermal conductivity of the powder is an uneven temperature distribution throughout the resulting powder layer. An increase in loading has an effect on the ability of the alloy to transfer heat because the addition of powder is an addition of a thermal insulator, which may result in areas of higher temperature within the powder layer and lower hydrogen absorption at the areas of higher temperature.

The amount of hydrogen storage alloy provided in the reaction vessel will generate a powder layer thickness. The powder layer thickness for a given amount of hydrogen storage alloy is dependent on the volume and geometry of the reaction vessel. An increase in the surface area of the vessel where the hydrogen storage alloy is in contact with the vessel will result in a reduced powder layer thickness for a given amount of hydrogen storage alloy, such as a heat transfer medium including cooling walls or a heat exchanger. An increase in the surface area of the vessel may. An increased packing factor causes locations of varying temperature (non-homogeneous temperature distributions) within the alloy because of the powder layer thickness and thermal conductivity According to the PCT curves, the alloy material at a higher temperature cannot absorb as much hydrogen as an alloy at a lower temperature given uniform hydrogen pressure. By accounting for the thermal conductivity, the effects of loading on powder formation may be negated. However, as the amount of alloy provided in the reaction chamber is increased, a longer period of time for cooling is required. By increasing the powder layer thickness of the alloy, a longer cooling time is necessary to reach the hydrogenation temperature at a given cooling rate.

The cooling rate of the alloy is not a factor that will effect powder yield. However, if a slower cooling rate is employed, a longer period of time will be required to reach the hydrogenation temperature and the practical commercial value of the improved process will be partially reduced. The cooling time required to achieve a hydrogen storage alloy temperature is a function of the thermal conductivity of the powder, the powder layer thickness, and the cooling rate.

Figure 3:
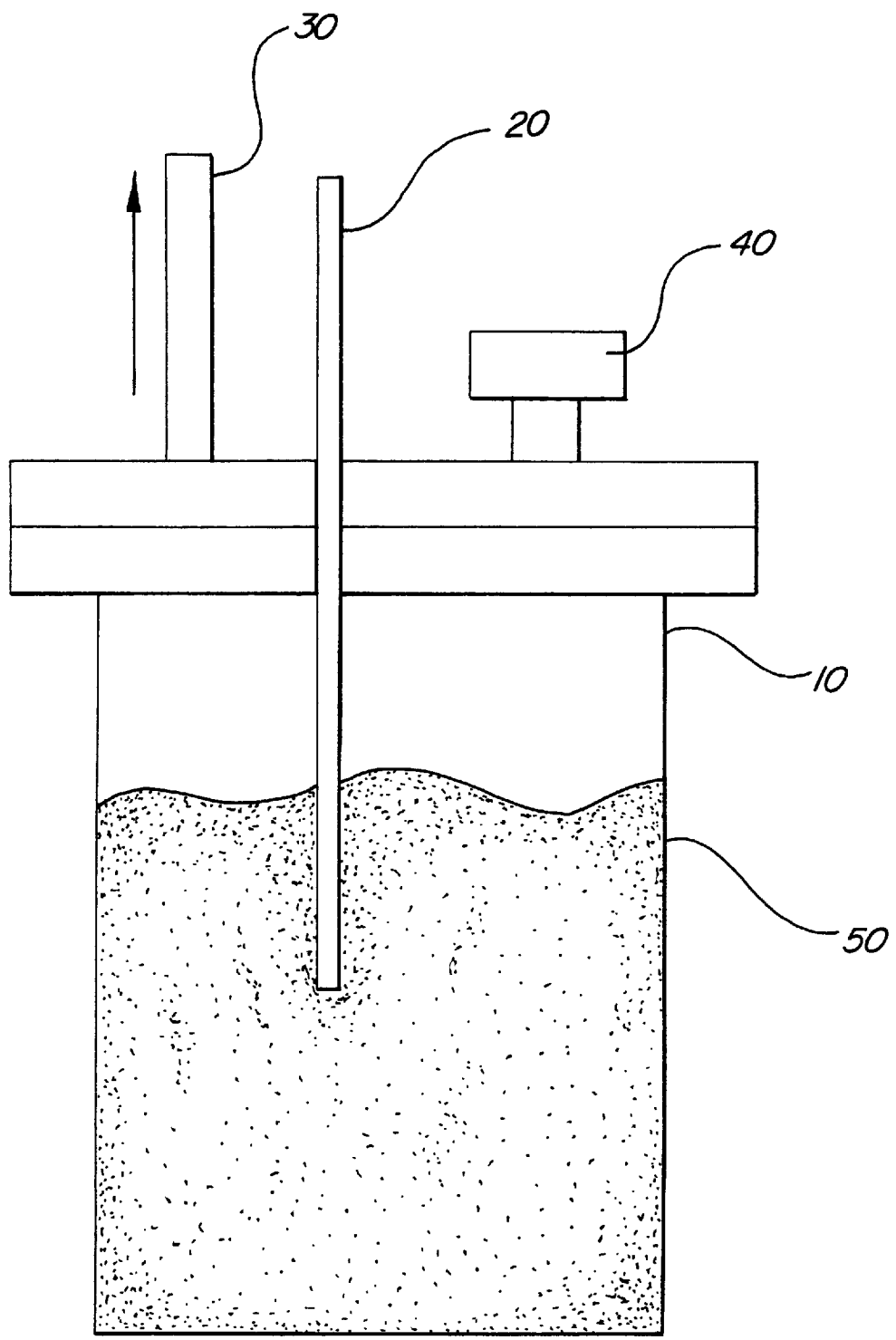
FIG. 3 is a schematic illustration of one embodiment of a reaction vessel utilized in the powder formation process of the present invention.

Referring now to FIG. 3, a schematic illustration of an embodiment of a reaction vessel 10 utilized according to the teachings of the present invention is shown. The pressure vessel 10 is shown containing particulate hydrogen storage alloy after hydriding. A thermocouple 20, is disposed in the reaction vessel 10 so as to provide a temperature measurement of the hydrogen storage alloy. A gas conduit 30 having a first end operatively communicating with the interior of the reaction vessel 10 and a second end in operative communication with a gas manifold (not shown). A pressure relief valve 40 is also in communication with the reaction vessel 10.

The powder formation process begins with placing an ingot (not shown) of hydrogen storage alloy into the reaction vessel 10. The reaction vessel 10 is sealed and residual air is removed. In the exemplary embodiment, pressure within the reaction vessel 10 is pumped down. The reaction vessel 10 is then flushed with an inert gas. It will become apparent to one skilled in the art that various combinations and arrangements of valves, manifolds, and other pressure control devices may be incorporated to control the pressure within the reaction vessel 10. Any such arrangement is within the scope of the present invention. After ambient air is removed from the reaction vessel 10, the hydriding process may begin.

Hydrogen gas is introduced into the reaction vessel 10 through gas conduit 30 under constant pressure, as is well known in the art. Although this illustration of the present invention introduces hydrogen gas at a constant pressure to obtain a precise powder yield, excellent results may also be achieved by introducing hydrogen gas at a non-constant pressure. The hydrogenation process begins once the hydrogen begins to be incorporated within the hydrogen storage alloy.

The exothermic heat of reaction causes the temperature of the reaction vessel 10 to rise. In the exemplary embodiment, cooling is achieved by immersing the reaction vessel 10 in an isothermal bath, although any suitable technique for cooling may be incorporated, including the incorporation of a cooling jacket around the vessel 10 or an internal heat exchanger. For purposes of the present invention, cooling is intended to include active cooling and passive cooling. The pressure relief valve 40 may be used to control the pressure within the reaction vessel 10. Once the hydrogenation temperature is reached, the hydrogenation process is terminated and the alloy is dehydrided.

The dehydrogenation process is accomplished by heating the reaction vessel 10 to 400° C. while reducing the pressure in the reaction vessel. Once the pressure within the reaction vessel 10 falls below 400 mtorr, the reaction vessel 10 is cooled to room temperature. After the hydrogenation step, a mixture of oxygen with nitrogen or some inert gas was introduced to the vessel and oxidized the surface of the powder. This pre-oxidation step was to assure safe powder handling in the subsequent processes. The powder is then removed.

Hydrogenation process experimentation was performed by varying significant process parameters including: powder loading; hydrogen pressure within the reaction vessel; and hydrogenation temperature. The results were indicated by the percentage of powder particulate having a particle size less than 75 microns. The experiment is summarized in table II below:

TABLE II

Powder Yield from Different Hydriding Conditions

| Sample | H$_2$ pressure | Loading | Peak Hydride Temp. | Hydrogenation Temp. | Ave. Size | Yield (<75μ) |
|---|---|---|---|---|---|---|
| 1 | 36 psi | Light (2 kg) | 25° C. | 15° C. | 35 μm | 95% |
| 2 | 15 psi | Light (2 kg) | 90° C. | 25° C. | 51 μm | 80% |
| 3 | 25 psi | Light (2 kg) | 90° C. | 25° C. | 45 μm | 87% |
| 4 | 30 psi | Light (2 kg) | 90° C. | 25° C. | 47 μm | 85% |
| 5 | 36 psi | Light (2 kg) | 90° C. | 25° C. | 39 μm | 93% |
| 6 | 36 psi | Light (2 kg) | 100° C. | 50° C. | 51 μm | 80% |
| 7 | 36 psi | Light (2 kg) | 85° C. | 75° C. | 55 μm | 75% |
| 8 | 36 psi | Light (2 kg) | 90° C. | 90° C. | 56 μm | 74% |
| 9 | 36 psi | Light (2 kg) | 120° C. | 100° C. | 302 μm | 11% |
| 10 | 36 psi | Heavy (20 kg) | 90° C. | 15° C. | 43 μm | 88% |

TABLE II-continued

Powder Yield from Different Hydriding Conditions

| Sample | H$_2$ pressure | Loading | Peak Hydride Temp. | Hydrogenation Temp. | Ave. Size | Yield (<75µ) |
|---|---|---|---|---|---|---|
| 11 | 36 psi | Heavy (20 kg) | 50° C. | 15° C. | 42 µm | 93% |
| 12 | 36 psi | Heavy (20 kg) | 90° C. | 45° C. | 65 µm | 73% |
| 13 | 15 psi | Heavy (20 kg) | 90° C. | 45° C. | 90 µm | 65% |

The present invention provides the ability to select hydride/dehydride parameters, hydrogenation temperature and pressure, to produce an average particle size with a narrow particle size distribution. The powder yield table above reveals some hydride parameter settings to obtain an average particle size. As mentioned above, loading refers to the mass of hydrogen storage alloy for a reaction vessel having a given volume. It should be noted that optimum particle size may be alloy dependent and the instant invention provides for process parameters to be varied so as to obtain optimally sized particulate for any given alloy.

From the data in Table II, an empirical formula was obtained:

$$\text{powder yield } (<75 \, \mu m) = \text{Factor}_{loading} \times \text{Factor}_{pressure} \times \text{Factor}_{hydrogenation\ temperature}$$

where, $\text{Factor}_{loading}$=0.95 (light loading), 0.93 (heavy loading and 15° C.), 0.85 (heavy loading and 45° C.);

$$\text{Factor}_{pressure}=1.0 \, (\geq 36 \text{ psi}), 0.93 \, (25 \text{ psi}), \text{ and } 0.84 \, (15 \text{ psi});$$

and $$\text{Factor}_{hydrogenation\ temperature}=1.0 \, (\leq 15° \text{ C.}), 0.97 \, (25° \text{ C.}), 0.83 \, (45° \text{ C.}), 0.79 \, (75° \text{ C.}), 0.78 \, (90° \text{ C.}), \text{ and } 0.11 \, (100° \text{ C.}).$$

Figure 4:
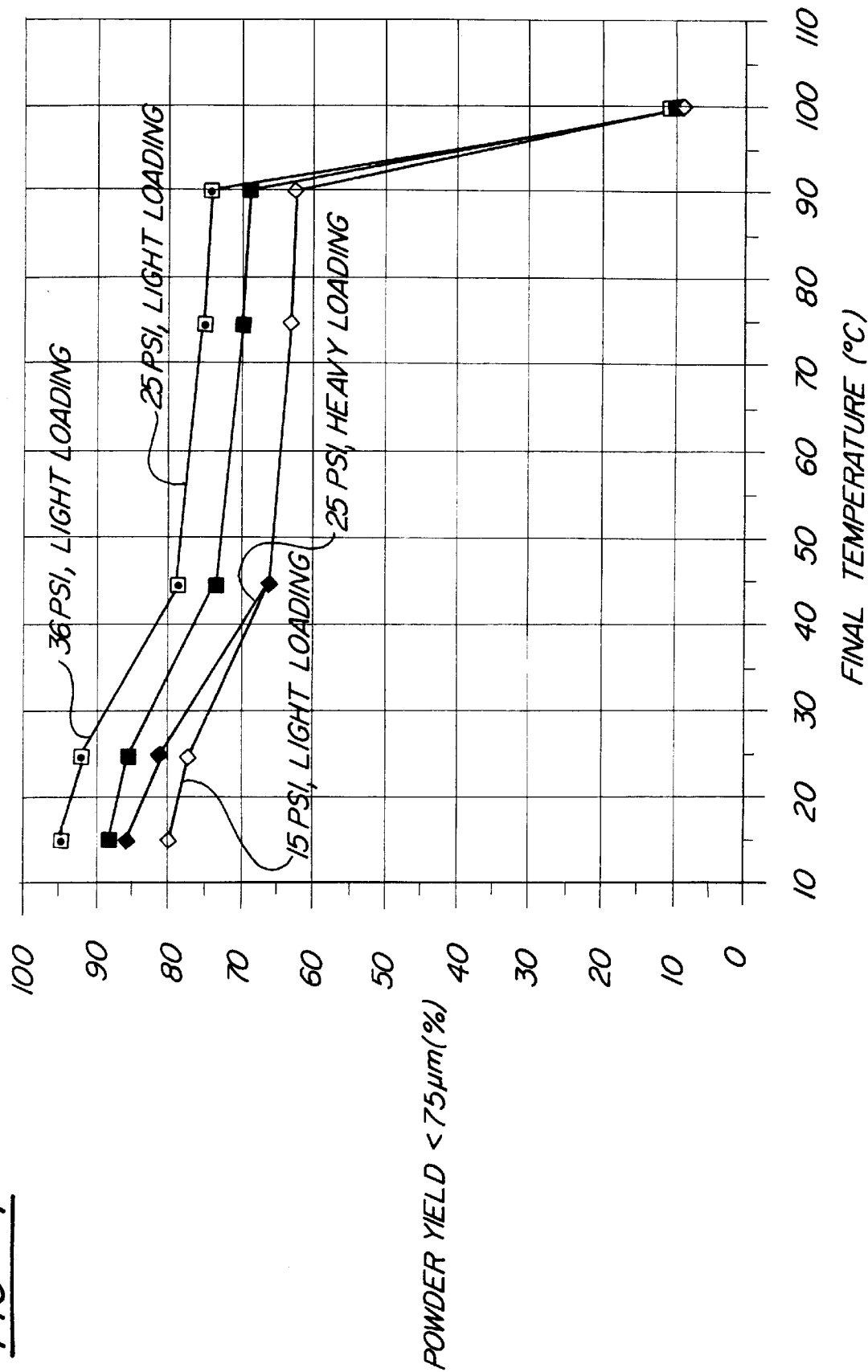
FIG. 4 depicts a series of graphical representations of the formula predicting powder yield vs. hydrogenation temperature as a function of hydrogen pressure.

FIG. 4 is a graphical representation of the empirical formula disclosed above, where powder yield (<75 µm), is plotted along the Y-axis, versus the final hydrogenation temperature, plotted along the X-axis, as a function of hydrogen gas pressure and loading, where each plot represents powder yield at a given gas pressure and load condition.

The effects of loading have been discussed above and determined to be a result of the low thermal conductivity of the powder alloy. An ingot with a mass of about 2 kg in a reactor having a volume of about 9 liters represented the light loading condition and resulted in a powder layer thickness of about 2.5 cm. The heavy loading condition incorporated a few ingots with a total mass of 20 kg also placed in a reactor having a volume of about 9 liters, resulting in a powder layer thickness of about 25 cm. The reaction vessel employed in the above experiment has a diameter of 15 cm and a height of 50 cm. The values for Factor $_{loading}$ account for the powder layer thickness resulting from the particular loading condition. Therefore loading, being the mass of activated material per unit volume, is actually the amount of material that will result in a particular powder layer thickness for a given geometry. In the instant experiment, light loading formed a powder layer thickness of about 2.5 cm, and heavy loading formed a powder layer thickness of about 25 cm. The discussion above regarding the heat transfer properties of the alloy elucidates the requirement for distinct factors for Factor $_{loading}$ at heavy loading with hydrogenation temperatures 15° C. and 45° C. as the inability of the alloy to conduct heat, restricting the amount of hydrogen that can be absorbed.

Figure 5:
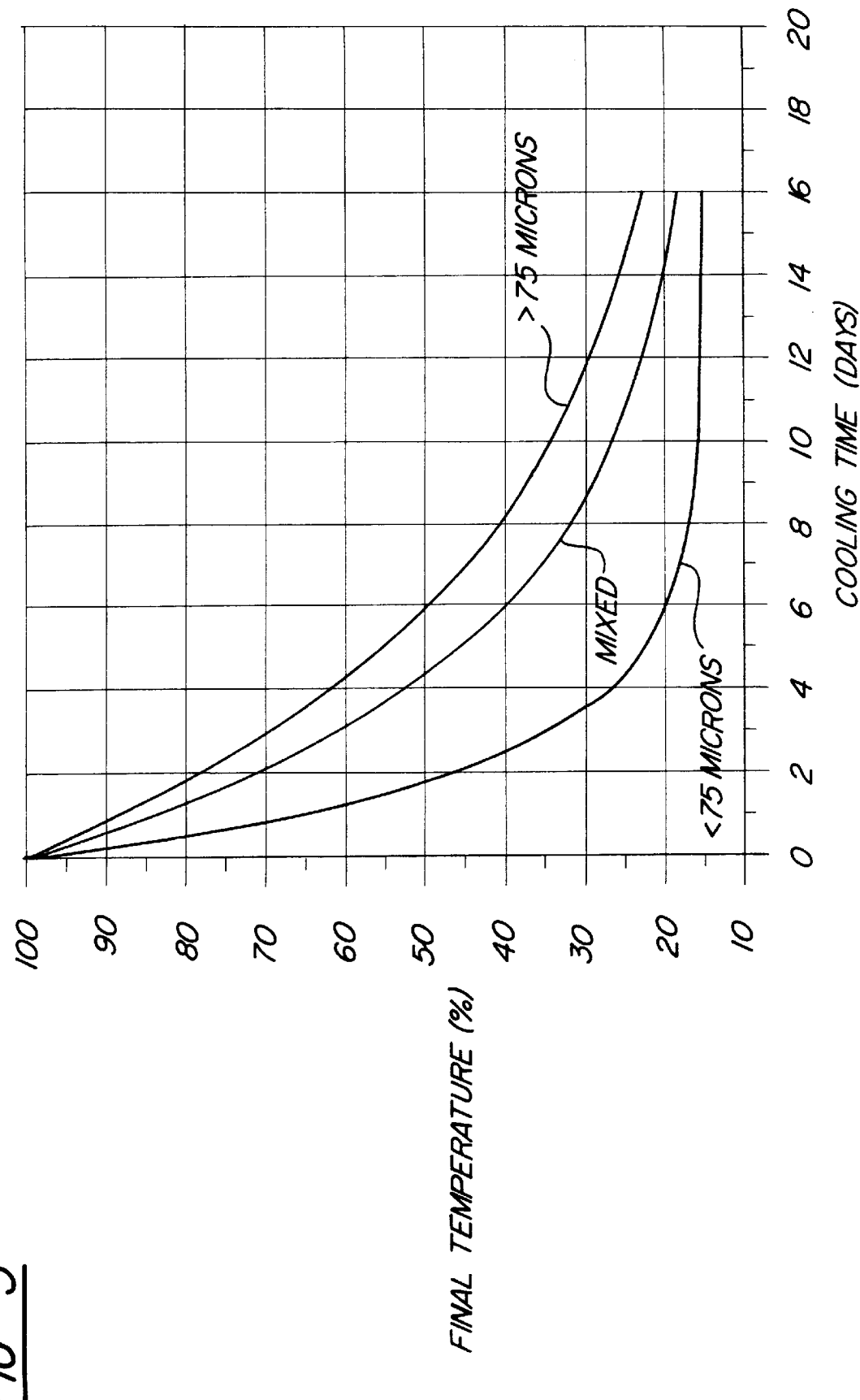
FIG. 5 depicts a series of graphs of the calculated cooling time vs. hydrogenation temperature as a function of hydrogen storage material particle size.

In order to implement the results of the present invention to production, the cooling time to 25° C. was calculated using the thermal conductivities of the powder as disclosed in the measured thermal conductivities table above. Referring now to FIG. 5, the results of the calculation are displayed. Cooling time in days, plotted along the X-axis, versus final temperature, plotted along the Y-axis, is displayed for each of three particle size distributions. In a 2500 kg production reactor, the resulting cooling time to reach 25° C. throughout the powder was calculated to be 10 days. This is an unacceptable length of time for a commercially viable production process.

Figure 6:
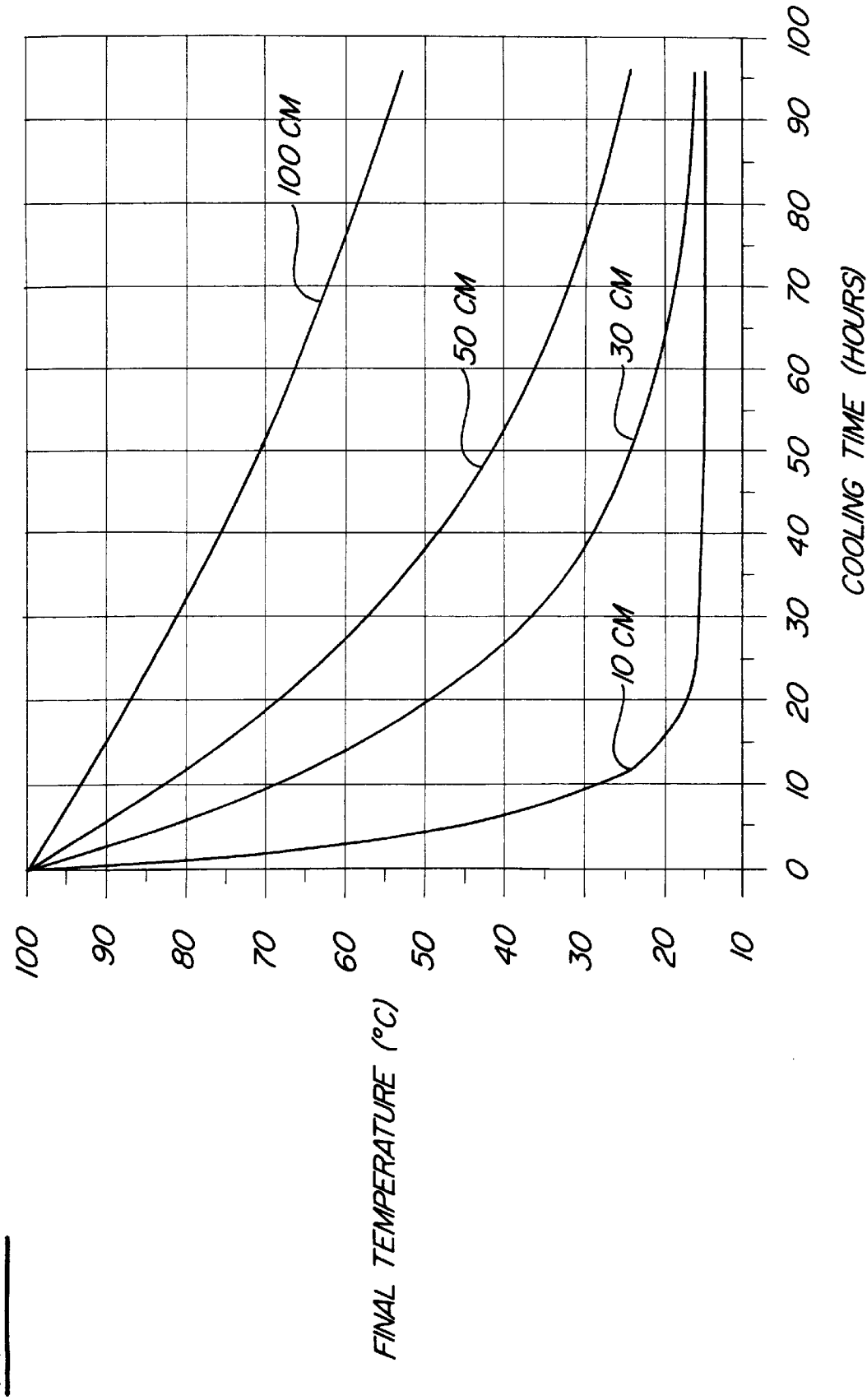
FIG. 6 depicts a series of graphs of the calculated cooling time vs. hydrogenation temperature as a function of powder thickness.

Accordingly, the cooling time to reach 25° C. was recalculated under with modified loading conditions. Referring now to FIG. 6, the results of the calculation for such modified loading conditions are displayed. Cooling time in hours, plotted along the X-axis, as a function of final temperature, plotted along the Y-axis, is displayed for four powder layer thicknesses. As discussed above, the powder layer thickness is a function of the loading. For the same cooling rate, by reducing the powder layer thickness to 50 cm, the cooling time to 25° C. is reduced to 90 hours.

In light of the teachings disclosed herein, the ratio of the cooled surface area of the reactor to the amount of hydrogen storage alloy provided within the reactor for hydrogenation will have a strong impact on the cooling time and thus improve process efficiency. The ratio of cooled surface area to alloy mass may be referred to as the powder thickness ratio. Furthermore, if the material within the reactor is manipulated so that cooling was more efficient, process efficiency would improve further still. An example of this would be to cause a limited thickness of powder to be in contact with a cooling surface.

EXAMPLE

Described hereinbelow is one example of the formation of a hydrogen storage alloy powder produced by the method of the present invention. This example is provided to illustrate, and is not intended to limit the invention to the following embodiment or procedure.

Referring again to FIG. 3, a 2 kg ingot made from a hydrogen storage alloy with composition $V_5Ti_8Zr_{27}Ni_{38}Cr_5Mn_{16}$ having both C14 (hexagonal) and C15 (FCC) phases was placed in a reaction vessel 10. The reaction vessel 10 has a diameter of 15 cm, a height of 50 cm, and a pressure rating of 5000 psi. A K-type thermocouple 20, was placed at the center of the reaction vessel 10 to monitor the alloy temperature. A gas conduit 30 having a first end in communication with the reaction vessel 10, and a second end in communication with a gas manifold (not shown), is employed to convey gas to and from the reaction vessel 10. The reaction vessel 10 was pumped to 20 mtorr and flushed by transporting argon gas through the gas conduit 30.

Hydrogen gas under a supply pressure of 36 psi was introduced via the gas conduit 30 into the reaction vessel 10 during hydriding. A pressure control valve 40 is also in communication with the reaction vessel 10, and may be used to reduce the pressure inside the reaction vessel 10 due to thermal effects.

During hydrogenation, the temperature of the reaction vessel 10 will increase due to the exothermic nature of the hydriding reaction (approximately 10 kcal/mol of $H_2$ gas). The reaction vessel 10 is therefore cooled while hydriding to achieve a hydrogenation temperature of at least 25° C. The hydriding process was terminated when the hydrogenation temperature was reached.

A dehydriding step was then performed to remove hydrogen from the hydrogen storage alloy. Dehydriding was achieved by heating the reaction vessel 10 to 400° C. to draw out the hydrogen stored in the alloy. The hydrogen was pumped out of the reaction vessel 10 via the gas conduit 30. The dehydriding step is complete when the final pressure of the reaction vessel drops below 400 mtorr. The reaction vessel 10 was then cooled down to room temperature. The loading resulted in a powder layer thickness of about 2.5 cm. The alloy powder was then removed from the reaction vessel 10 for analysis.

The particle size distribution of the powder was measured by a MICROTRAC particle size analyzer which utilizes forward scattered light from a laser beam. A powder yield with more than 90% of the particles having a size less than 75 $\mu$m was obtained. The particle size distribution of the powder is displayed in FIG. 1 as line "c".

While the present invention has been described in preferred embodiments and procedures, it is to be understood that the detailed description is illustrative and not intended to limit the invention to the preferred embodiments and procedures herein. On the contrary, the instant invention is intended to cover all alternatives, modifications, and equivalences which may be included within the spirit and scope of the invention as defined by the claims appended hereto.

What is claimed is:

1. A method for forming powder of an activated material without subsequent mechanical processing by providing an amount of activated material in a reaction vessel and removing residual air from the reaction vessel, introducing hydrogen gas into the reaction vessel at a pressure, said pressure being between about 15 to 100 psi, the hydrogen gas causing hydrogenation of the activated material; and cooling the activated material during hydrogenation to a temperature less than about 60 degrees Centigrade, whereby a hydrogen concentration in the activated material is obtained, said hydrogenation process forms a powder in which 90% of the particles are less than 250 microns.

2. The method as in claim 1, wherein the activated material is an electrochemical hydrogen storage alloy.

3. The method as in claim 2, further comprising the step of dehydriding the hydrogen storage alloy after hydrogenation.

4. The method as in claim 2, wherein the hydrogen is introduced at a pressure between about 15 to 36 psi.

5. The method as in claim 2, wherein the alloy is cooled to a hydrogenation temperature suitable for forming particles with an average particle size of 90 microns or less.

6. The method as in claim 2, wherein the alloy is cooled to a hydrogenation temperature whereby 90% of the particles are less than 75 microns.

7. The method as in claim 6, wherein said activated material is cooled to about 30 degrees Centigrade or less.

8. The method as in claim 7, wherein said hydrogen gas is introduced at a pressure of at least 25 psi.

9. An electrochemical hydrogen storage alloy powder formed by a hydrogenation process without subsequent mechanical processing by providing an amount of hydrogen storage alloy in a reaction vessel and removing residual air from the reaction vessel said alloy powder having 90% of the powder particles being less that 250 microns, said process comprising the steps of:

introducing hydrogen gas into the reaction vessel at a pressure, said hydrogen pressure being between about 15 to 100 psi, the hydrogen gas causing the hydrogenation of the hydrogen storage alloy; and cooling the hydrogen storage alloy to a hydrogenation temperature less than about 60 degrees Centigrade whereby a hydrogen concentration in the hydrogen storage alloy is obtained to form a powder in which 90% of the particles are less than 250 microns.

10. The alloy powder formed by a hydrogenation process as in claim 9, further comprising the step of dehydriding said hydrogen storage alloy after hydrogenation.

11. The alloy powder formed by a hydrogenation process as in claim 9, wherein the hydrogen is introduced at a pressure between about 15 to 36 psi.

12. The alloy powder formed by a hydrogen process as in claim 9, wherein said alloy is cooled to a hydrogenation temperature to achieve a particle size range having an average particle size of from 35 to about 90 microns.

13. The alloy powder formed by a hydrogenation process as in claim 9, wherein said alloy is cooled at or below a hydrogenation temperature, whereby at least 74% of the particles have a particle size below 75 microns.

14. The alloy powder formed by a hydrogenation process as in claim 13, wherein said alloy is cooled to a hydrogenation temperature, wherein the hydrogenation temperature is less than about 30 degrees Centigrade.

15. The alloy powder formed by a hydrogenation process as in claim 14, wherein the hydrogen gas is introduced at a pressure of at least 25 psi.

16. The alloy powder formed by a hydrogenation process as in claim 9, wherein said alloy is cooled to a hydrogenation temperature to achieve a particle size range between about 1 to 100 microns having an average of 35 microns.

17. A method for forming powder of an electrochemical hydrogen storage alloy, by controlling hydrogen absorption into the electrochemical hydrogen storage alloy, by introducing an amount of hydrogen storage alloy in a reaction vessel and removing residual air from the reaction vessel, the alloy adapted for use as the negative electrode material of rechargeable electrochemical, hydrogen storage cells, characterized in that:

hydrogen gas is introduced into the reaction vessel at a hydrogen pressure between about 15 to 100 psi, the hydrogen gas causing hydrogenation of the hydrogen storage alloy; and the hydrogen storage alloy is cooled to a hydrogenation temperature less than about 60 degrees Centigrade whereby a hydrogen concentration in the hydrogen storage alloy is obtained to form a powder in which 90% of the particles are less than 250 microns.

18. The method as in claim 17, further comprising the step of dehydriding the hydrogen storage alloy after hydrogenation.

19. The method as in claim 17, wherein the hydrogen is introduced at a pressure between about 15 to 36 psi.

20. The method as in claim 17, wherein the alloy is cooled to a hydrogenation temperature whereby at least 74% of the particles are less than 75 microns.

21. The method as in claim 20, wherein said hydrogenation temperature is less than about 30° Centigrade.

22. The method as in claim 21, wherein said hydrogen gas is introduced at a pressure of at least 25 psi.

23. The method as in claim 22, wherein the alloy is cooled to a hydrogenation temperature to achieve a particle size range having an average particle size of 35 microns to 90 microns.

24. A method for controlling powder formation of an electrochemical hydrogen storage alloy by a hydrogenation process, without subsequent mechanical processing, whereby the hydrogenation process forms a powder having a powder yield of particles less than 250 microns, said method including the steps of controlling powder yield pursuant to the following relationship wherein the yield is a factor of only loading, pressure, and hydrogenation temperature:

Powder yield=$Factor_{loading} \times Factor_{pressure} \times Factor_{hydrogenation\ temperature}$;

and, where $Factor_{loading}$=0.95 to 0.85; $Factor_{pressure}$=1.0 to 0.84; and $Factor_{hydrogenation\ temperature}$=1.0 to 0.11.

25. The method as in claim 4, wherein the desired powder size distribution is less than 75 $\mu$m.

26. The method as in claim 24, wherein $Factor_{loading}$=0.95 represents a mass to volume ratio of about 2/9 Kg/L.

27. The method as in claim 24, wherein $Factor_{loading}$=0.95 represents a powder layer thickness of about 2.5 cm.

28. The method as in claim 24, wherein $Factor_{pressure}$=1.0 represents a hydrogen pressure $\geq$36 psi.

29. The method as in claim 24, wherein $Factor_{hydrogenation\ temperature}$=1.0 represents a hydrogenation temperature $\leq$15° C.

30. A method for forming powder of an electrochemical hydrogen storage alloy without subsequent mechanical processing by providing an amount of the hydrogen storage alloy in a reaction vessel, removing residual air from said reaction vessel, the hydrogen storage alloy having the composition $(Base\ Alloy)_a Co_b Mn_c Fe_d Sn_e$, where the Base Alloy comprises 0 to 60 atomic percent Ti, 0.1 to 40 atomic percent Zr, 0 to 60 atomic percent V, 0.1 to 57 atomic percent Ni and 0 to 56 atomic percent Cr; b is 0 to 7.5 atomic percent; c is 12 to 30 atomic percent; d is 0 to 3.5 atomic percent; e is 0 to 1.0 atomic percent; and a+b+c+d+e=100 atomic percent, said method comprising the steps of:

introducing hydrogen gas into said reaction vessel at a pressure between about 15 to 100 psi, the hydrogen gas causing the hydrogen storage alloy to become hydrogenated;

cooling the hydrogen storage alloy to a hydrogenation temperature less than about 60 degrees Centigrade whereby a hydrogen concentration in the hydrogen storage alloy is obtained to form a powder in which 90% of the particles are less than 250 microns.

31. The method as in claim 30, wherein the atomic percentage of Mn within the hydrogen storage alloy is equal to 0.

32. The method as in claim 31, wherein the atomic percentage of Zr within the hydrogen storage alloy is equal to 25 to 40.

33. The method as in claim 30, further comprising the step of dehydriding the hydrogen storage alloy after hydrogenation.

34. The method as in claim 30, wherein the hydrogen is introduced at a pressure between about 15 to 36 psi.

35. The method as in claim 30, wherein the alloy is cooled to a hydrogenation temperature whereby at least 74% of the particles are less than 75 microns.

36. The method as in claim 35, wherein said hydrogenation temperature is less than about 30° Centigrade.

37. The method as in claim 36, wherein said hydrogen gas is introduced at a pressure of at least 25 psi.

38. The method as in claim 30, wherein the alloy is cooled to a hydrogenation temperature to achieve a particle size range having an average particle size of 35 microns to 90 microns.

39. A rechargeable electrochemical storage cell having a negative electrode, said negative electrode including an activated material powder formed by a hydrogenation process by providing an amount of hydrogen storage alloy in a reaction vessel and removing residual air from the reaction vessel, said powder being formed without subsequent mechanical processing, said alloy powder having 90% of the powder particles being less that 250 microns, the process comprising the steps of:

introducing hydrogen gas into the reaction vessel at a pressure, said hydrogen pressure being between about 15 to 100 psi, the hydrogen gas causing the hydrogenation of the hydrogen storage alloy; and cooling the hydrogen storage alloy to a hydrogenation temperature less than about 60 degrees Centigrade whereby a hydrogen concentration in the hydrogen storage alloy is obtained to form a powder in which 90% of the particles are less than 250 microns.

40. The rechargeable electrochemical storage cell having a negative electrode, said negative electrode including an electrochemical hydrogen storage alloy powder formed by a hydrogenation process as in claim 39, wherein said activated material is an electrochemical hydrogen storage alloy.

41. The rechargeable electrochemical storage cell having a negative electrode, said negative electrode including an activated material powder formed by a hydrogenation process as in claim 40, wherein said electrochemical hydrogen storage alloy has the composition $(Base\ Alloy)_a Co_b Mn_c Fe_d Sn_e$, where the Base Alloy comprises 0 to 60 atomic percent Ti, 0.1 to 40 atomic percent Zr, 0 to 60 atomic percent V, 0.1 to 57 atomic percent Ni and 0 to 56 atomic percent Cr; b is 0 to 7.5 atomic percent; c is 12 to 30 atomic percent; d is 0 to 3.5 atomic percent; e is 0 to 1.0 atomic percent; and a+b+c+d+e=100 atomic percent.

42. The rechargeable electrochemical storage cell having a negative electrode, said negative electrode including an activated material powder formed by a hydrogenation process as in claim 41, wherein the alloy is cooled to a hydrogenation temperature whereby at least 74% of the particles are less than 75 microns.

43. The rechargeable electrochemical storage cell having a negative electrode, said negative electrode including an activated material powder formed by a hydrogenation process as in claim 42, wherein said hydrogenation temperature is less than about 30° Centigrade.

44. The rechargeable electrochemical storage cell having a negative electrode, said negative electrode including an activated material powder formed by a hydrogenation process as in claim 43, wherein said hydrogen gas is introduced at a pressure of at least 25 psi.

45. The rechargeable electrochemical storage cell having a negative electrode, said negative electrode including an activated material powder formed by a hydrogenation process as in claim 41, wherein the alloy is cooled to a hydrogenation temperature to achieve a particle size range between about 1 to 100 microns having an average particle size of 35 microns.

46. A rechargeable electrochemical storage cell having a negative electrode, said negative electrode including an electrochemical hydrogen storage alloy powder formed by a hydrogenation process, without subsequent mechanical processing, by providing an amount of hydrogen storage alloy in a reaction vessel and removing residual air from the reaction vessel, said hydrogen storage alloy having the composition (Base Alloy)$_a$Co$_b$Mn$_c$Fe$_d$Sn$_e$, where the Base Alloy comprises 0 to 60 atomic percent Ti, 0.1 to 40 atomic percent Zr, 0 to 60 atomic percent V, 0.1 to 57 atomic percent Ni and 0 to 56 atomic percent Cr; b is 0 to 7.5 atomic percent; c is 12 to 30 atomic percent; d is 0 to 3.5 atomic percent; e is 0 to 1.0 atomic percent; and a+b+c+d+e=100 atomic percent, said alloy powder having 90% of the powder particles being less that 250 microns, the process comprising the steps of:

introducing hydrogen gas into said reaction vessel at a pressure between about 15 to 100 psi, the hydrogen gas causing the hydrogen storage alloy to become hydrogenated;

cooling the hydrogen storage alloy to a hydrogenation temperature less than about 60 degrees Centigrade whereby a hydrogen concentration in the hydrogen storage alloy is obtained to form a powder in which 90% of the particles are less than 250 microns.

47. The method as in claim 46, wherein the atomic percentage of Mn within the hydrogen storage alloy is equal to 0.

48. The method as in claim 46, wherein the atomic percentage of Zr within the hydrogen storage alloy is equal to 25 to 40.

* * * * *